(12) United States Patent
Helland et al.

(10) Patent No.: US 6,329,128 B1
(45) Date of Patent: Dec. 11, 2001

(54) STABLE ANTIHALATION MATERIALS FOR PHOTOGRAPHIC AND PHOTOTHERMOGRAPHIC ELEMENTS

(75) Inventors: Randall H. Helland, Maplewood; Charles W. Gomez, Cottage Grove; William D. Ramsden, Afton, all of MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/431,734

(22) Filed: May 1, 1995

(51) Int. Cl.[7] .............................. G03C 1/37; G03C 1/825
(52) U.S. Cl. .................... 430/510; 430/517; 430/527; 430/528; 430/619; 430/631; 430/944
(58) Field of Search .................................. 430/631, 944, 430/517, 510, 635, 632, 527, 528, 619

(56) References Cited

U.S. PATENT DOCUMENTS

| | | | |
|---|---|---|---|
| 3,743,608 | * | 7/1973 | Habu et al. ............................ 430/527 |
| 3,811,887 | * | 5/1974 | Ishihara et al. ....................... 430/527 |
| 5,380,635 | * | 1/1995 | Gomez et al. ......................... 430/517 |
| 5,395,747 | * | 3/1995 | Helland et al. ........................ 430/510 |

* cited by examiner

Primary Examiner—Thorl Chea

(57) ABSTRACT

An infrared photosensitive element comprising:
   a support bearing an infrared radiation-sensitive silver halide material;
   and an antihalation layer comprising a basic antistatic agent, an acid having a pKa less than 4.2 in an amount equal to at least 1.0% mole equivalent of acid to 1 mole equivalent of amine in said antistatic agent, and sufficient antihalation dye to provide a transmission optical density at the wavelength of maximum absorbence of said dye of at least 0.2 after coating.

32 Claims, No Drawings

STABLE ANTIHALATION MATERIALS FOR PHOTOGRAPHIC AND PHOTOTHERMOGRAPHIC ELEMENTS

BACKGROUND TO THE INVENTION

1. Field of the Invention

This invention relates to the stabilization of dyes useful as antihalation and acutance materials for photographic and photothermographic elements when those dyes are combined in solution with antistatic agents having groups capable of accepting a proton (a basic material) from or capable of nucleophilic reaction with the conjugated portions of the antihalation dye and thereby altering the spectral absorbance of that dye.

2. Background of the Art

Light-sensitive recording materials, such as photographic and photothermographic elements, frequently suffer from a phenomenon known as halation which causes degradation in the quality of the recorded image. These light sensitive recording materials typically comprise a photosensitive layer and a substrate such as film base. Image quality degradation occurs when a fraction of the imaging light which strikes the photosensitive layer is not absorbed, but instead passes through to the film base on which the photosensitive layer is coated. A portion of the light reaching the base may be reflected back to strike the photosensitive layer from the underside. This reflected light may, in some cases, contribute significantly to the total exposure of the photosensitive layer. Any particulate matter (including silver halide grains) in the photosensitive element may also cause light passing through the element to be scattered. Scattered light which is reflected from the film base will, on its second passage through the photosensitive layer, cause exposure over an area adjacent to the point of intended exposure. This effect leads to reduced image sharpness and image degradation. Silver-halide containing photographic elements (including photothermographic elements) are prone to this form of image degradation since the photosensitive layers contain light-scattering particles (see, T. N. James, *The Theory of the Photographic Process,* 4th Edition, Chapter 20, Macmillan 1977).

To improve the image sharpness of photographic elements, it is customary to incorporate into one or more layers of the element a dye which absorbs light that has been scattered within the coating and would otherwise lead to reduced image sharpness. To be effective, the absorption of this dye must be at about the same wavelength as the sensitivity of the photosensitive layer.

In the case of imaging materials coated on a transparent support, a light-absorbing layer is frequently coated in a separate backing layer or under layer on the reverse side of the support from the photosensitive layer. Such a coating, known as an "antihalation layer," effectively reduces reflection of light which has passed through the photosensitive layer. A similar effect may be achieved by interposing a light-absorbing layer between the photosensitive layer and the substrate. This construction, known in the art as an "antihalation under layer" is applicable to photosensitive coatings on non-transparent as well as on transparent supports.

It is also possible to improve image quality by coating a light-absorbing layer above the photosensitive layer of a photographic element. Coatings of this kind, described in U.S. Pat. Nos. 4,312,941; 4,581,323; and 4,581,325; reduce multiple reflections of scattered light between the internal surfaces of a photographic element.

A light-absorbing substance may also be incorporated into the photosensitive layer itself in order to absorb scattered light. Substances used for this purpose are known as "acutance dyes."

Essentially any dye which absorbs light at the wavelength of interest can be used as an antihalation dye, and potentially, as an acutance dye. The restraints on the choice of acutance dyes are greater as the dye must not interfere with the imaging chemistry. Typically this means that the dye cannot cause fogging of the silver in the imaging layer. Some recent patents dealing with antihalation and acutance dyes include U.S. Pat. No. 4,581,325; EP 0,102,781 A2; EP 0,377,961 A1; EP 0,329,491 A2; EP 0,397,435 A1.

Many substances are known which absorb visible and/or ultraviolet light, and many are suitable for image improvement purposes in conventional photographic elements sensitized to wavelengths below 700 nm.

However, the use of semiconductor light sources, and particularly laser diodes which emit in the red and near-infrared region of the electromagnetic spectrum, as sources for output of electronically stored image data onto photosensitive film or paper is becoming increasingly widespread. This has led to a need for high-quality imaging elements which are sensitive in the near infrared region.

The classes of organic dyes which are commonly employed for antihalation or acutance purposes in ultraviolet and visible light sensitive materials do not readily form stable derivatives and analogues which absorb strongly in the near-infrared. References to visible light herein refer to wavelengths between 400 and 700 nm and references to near-infrared light refer to wavelengths between 700 and 1400 nm, especially 750 to 1300 nm.

Since the human eye is insensitive to near-infrared radiation, coatings of dyes which absorb only at wavelengths longer than 700 nm appear colorless and would therefore be acceptable in imaging materials without any change in absorption during processing. Dyes of this type would be suitable as antihalation and/or acutance dyes in infrared sensitive imaging elements. Heptamethine and longer chain cyanine dyes are known which have absorption maxima in the near-infrared region of the spectrum. However, simple near-infrared absorbing cyanine dyes exhibit an absorption curve which is broadened on the short wavelength side and extends well into the visible region of the spectrum (see for example A. Weissberger and E. C. Taylor *Special Topics in Heterocyclic Chemistry*, John Wiley and Sons, 1977, page 540). This extended absorption curve into the visible results in an objectionably high blue or green appearance which requires further processing to decolorize or dissolve out the dyes.

U.S. Pat. No. 4,581,325 discloses a group of heptamethine cyanine dyes having a cyclopentene ring in the polymethine chain which are suitable for use as antihalation or acutance dyes in both photographic and photothermographic elements. European Patent Application 377 961 discloses use of polymethine dyes of a particular formula as alternative near-infrared antihalation or acutance dyes in either photographic or photothermographic elements.

Unfortunately, these dyes also have tails or some absorption in the visible region of the spectrum and, thus, display a slight purple tint. This tint is undesirable and prevents production of the photographic or photothermographic elements using a clear support or film base. Instead a film base with a slight tint is used to counteract the tint of the antihalation or acutance dye.

European Patent Application 569 857 discloses dyes which may be used as infrared or near infrared antihalation dyes in photographic elements. However, once again, the reference teaches that the dyes must be decolored or dissolved out during photographic processing.

Some dihydroperimidine squarylium dyes have been known for a number of years. In fact, squaraine dyes containing 2,3-dihydroperimidine terminal groups have been disclosed to absorb light in the near infrared region. K. A. Bello; N. Corns; J. Griffiths, *J. Chem. Soc., Chem. Commun.*, 1993, 452–454. However, this article discusses only the absorbence of the dyes in solvent. In addition, the data shown indicates some residual absorbence of the dye in the visible region. Finally, the article contains no discussion nor suggestion of use of dihydroperimidine squarylium dyes as either antihalation or acutance dyes.

U.S. Pat. No. 5,380,635 discloses that dihydroperimidine squarylium dyes are useful in antihalation layers or as acutance dyes in a photothermographic (dry silver) or photographic element. These dyes absorb radiation in the near-infrared region, from 750 to 850 nm, and impart only a very low degree of visible coloration to the photographic or photothermographic element, while improving image sharpness. The coloration that is imparted to the photographic or photothermographic element by these dyes tends to be quite neutral, frequently gray or grayish-brown. Thus, use of dihydroperimidine squarylium dyes as antihalation or acutance dyes enables use of clear supports or base films in the radiation sensitive elements.

It is often desirable to include antistatic agents into layers in photographic or photothermographic elements to reduce static electricity buildup. Static electricity is well known to interfere with both material handling of imageable elements and with the quality of the image itself. As many imageable elements are radiation-sensitive (e.g., light-sensitive), the discharge of static electricity as a spark (with visible radiation) can cause spurious images on the light-sensitive element. This is clearly undesirable, and is in part avoided by the addition of antistatic materials or layers into imageable elements. It now has been found that the addition of basic antistatic agents into antihalation layers can and often does react with the antihalation dye by changing the saturation of the dye and thereby changing the critical absorption characteristics of the dye and reducing its effectiveness or even adding spurious color to the element.

SUMMARY OF THE INVENTION

Antihalation coating solutions comprising both antihalation dyes and basic (or base containing) antistatic agents in a binder can display reduced reduction in the optical density of the antihalation dye at its primary (maximum) wavelength of absorption when an acid having a pKa of less than 4.2 is added to the antihalation solution before coating. This invention is particularly effective when amine-containing antistatic agents (either with amine groups in the antistat or as residues from the synthesis of the antistatic agents) are used as the antistatic agents. The problem has been found to be particularly acute with squarylium dyes, although the absorption altering reaction can clearly occur with any dye having conjugation in the dye structure which can be altered by a base (such as a free amine).

A preferred aspect of the present invention provides photosensitive element comprising a support bearing an electromagnetic-radiation-sensitive photographic silver halide material and a dihydroperimidine squarylium dye having the nucleus:

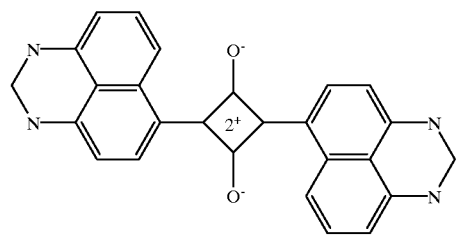

a basic antistatic agent, and an acid having a pKa of less than 4.2 in an amount sufficient to reduce the rate of reaction of the basic antistatic agent with the dye which causes wavelength changes in the absorption characteristics of said dye.

According to one preferred embodiment, the dihydroperimidine squarylium dyes used as antihalation or acutance dyes, have the general formula:

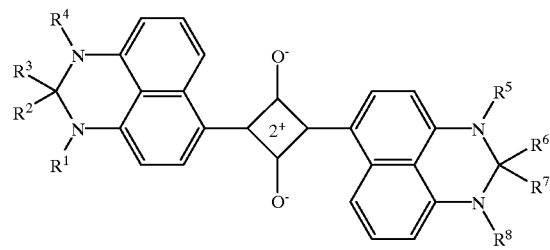

wherein
  $R^1$, $R^4$, $R^5$, and $R^8$ each independently represent hydrogen, an alkyl group having from 1–20 carbon atoms, a cycloalkyl group having from 1–20 carbon atoms, an aryl group having up to 14 carbon atoms, an aralkyl group, and
  $R^2$, $R^3$, $R^6$, and $R^7$, each independently represent hydrogen, an alkyl group having from 1–20 carbon atoms, a cycloalkyl group having from 1–20 carbon atoms, an aryl group having up to 14 carbon atoms an aralkyl group, or —$CH_2OR^9$ wherein $R^9$ is selected from the group consisting of: an alkyl acyl group; —C(=O)R where R is an alkyl group of 1 to 20 carbon atoms; —SiR'R''R''' where R', R'', and R''' independently represent an alkyl group of 1 to 20 carbon atoms; and —$SO_2R^{10}$ where $R^{10}$ is an alkyl group of 1 to 20 carbon atoms; or R¹ and R², and/or R³ and R⁴, and/or R⁵ and R⁶ and/or R⁷ and R⁸; or R² and R³ and/or R⁶ and R⁷ are bonded together to form a 5-, 6-, or 7-membered ring.

To improve image quality and sharpness, antihalation layers are needed for photothermographic films. These layers contain a dye which absorbs at the exposure wavelength, reducing reflected light within the construction. For near infra-red exposed films, a particularly useful class of antihalation dyes are the bis(dihydroperimidine) squarylium dyes, which are the subject of U.S. Pat. No. 5,380,635. Unfortunately, these dyes tend to have the undesirable trait of slowly being destroyed in coating solutions in the presence of amine antistatic agents. This leads to antihalation layer coating solution pot lives of considerably less than the desired 24 hours. This invention relates to pot-life stabilization of bis(dihydroperimidine)squarylium dyes when using amine antistatic agents. Certain acids have been found to minimize the bleaching of the dyes in solution, before coating, without adversely affecting the antistatic properties of the coated film.

Preferred antistatic agents of the invention are quaternary ammonium compounds which exhibit an affinity for water molecules, which in turn serve to reduce the surface resistivity of the materials into which they are added. The behavior of these antistatic agents within a solution is dependent on the overall composition of these compounds. Examples of these quaternary ammonium antistatic agents include alkoxylated (here, ethoxylated is shown) tertiary amines of a general structure:

$R_a$—N(CH$_2$CH$_2$OH)$_2$ in which $R_a$ represents a relatively long-chain alkyl group (e.g., greater than 5 carbon atoms, inclusive of 20, 30 or more carbon atoms).

The simplest amine salt antistatic agents are those of the formula:

(R¹¹)$_4$N⁺X⁻ wherein each R¹¹ independently represents an alkyl group of 8 to 30 atoms, preferably of 10 to 24 carbon atoms; and the anion X⁻ is typically methyl or ethyl sulfate.

The preferred amine antistatic agents used in the practice of the present invention are highly-fluorinated alkyl sulfonyl amine terminated polyoxyalkylene antistatic agents. These materials may generally be represented by the formula:

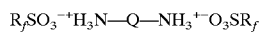

$R_fSO_3^-{}^+H_3N$—Q—$NH_3^+{}^-O_3SR_f$ wherein:
  $R_f$ is a highly fluorinated group (e.g., highly fluorinated or perfluorinated alkyl or aryl) highly fluorinated indicating that at least 65% of all substitutents on carbon atoms within the group are fluorine;
  Q is a divalent polyoxyalkylene group (e.g., polyoxyethylene, polyoxypropylene) such as —(CH$_2$CH$_2$O)$_n$—, —(CH$_2$CH$_2$CH$_2$O)$_n$—, and the like; and
  n is an integer of at least 1 and preferably between 2 and 30, more preferably between 2 and 18.

The acids used in the practice of the present invention are preferably organic acids having a pKa of less than about 4.2. Examples of useful acids include acetic acid, benzoic acid, 4-methylphthalic acid, tetrachlorophthalic acid, chlorobenzoylbenzoic acid, and trichloroacetic acid, and the like. Organic acids such as benzoic acid (pKa of 4.19) and acetic acid (pKa of 4.75) have been found to be somewhat useful, and show some benefit in reducing bleaching of the antihalation dye but may require large amounts to be effective. It is preferred that the acids have a pKa of less than about 3.5 and more preferred that they have a pKa of less than about 3.0 for the practice of the present invention. The acids should be used in an amount that can measurably reduce the change in optical density of the antihalation dye solution over a 24 hour period (e.g., reduce the change in optical density at the wavelength of absorbance by at least 0.1 over said 24 hour period at ambient conditions).

The acids are added into the coating composition at any time before coating. For maximum effectiveness, they are preferably added before addition of the antistatic agent. They are added in the functionally effective amounts described above which may be in the range of at least 0.50 mole equivalent of acid to 1 mole equivalent of each amine group in the antistatic agent, preferably at least 1.0 mole equivalent of acid to 1 mole equivalent of each amine group in the antistatic agent, more preferably, 1.5 mole equivalent of acid to 1 mole equivalent of each amine group in the antistatic agent. The acid may be used in any amount over this minimum, but should not flood the composition of the layer and destroy its beneficial physical properties. For example, there would be a practical limit of 10:1 mole ratio of acid to antistatic agent in the antihalation layer solution.

The pKa's of representative organic acids are shown below.

| Acid | pKa |
|---|---|
| Benzoic acid | 4.19 |
| 4-Methylphthalic acid | 2.9 |
| Tetrachlorophthalic acid | <2.9 |
| Chlorobenzoylbenzoic acid | not known |
| Acetic acid | 4.75 |
| Trichloroacetic acid | 0.70 |

Applicants believe that the function of the acid is to ensure that all of the amine groups of the antistatic agent are protonated. While the nominal structure of Antistat-1 given below indicates full quaternization of the amine groups, in practice, some free amino groups may be present. We have found that organic carboxylic acids having a pKa less than or equal to about 3.5 and preferably less than or equal to about 3.0 are very effective in reducing bleaching of antihalation dyes in photothermographic elements. Weaker acids appear less effective.

As is well understood in this area, substitution is not only tolerated, but is often advisable and substitution is anticipated on the compounds used in the present invention. As a means of simplifying the discussion and recitation of certain terminology used throughout this application, the terms "group" and "moiety" are used to differentiate between chemical species that allow for substitution or which may be substituted and those which do not so allow or may not be so substituted. Thus, when the term "group" is used to describe a chemical compound or substituent, the described chemical material includes the basic group and that group with conventional substitution. Where the term "moiety" is used to describe a chemical compound or substituent, only an unsubstituted chemical material is intended to be included. For example, the phrase "alkyl group" is intended to include not only pure open-chain and cyclic saturated hydrocarbon alkyl substituents, such as methyl, ethyl, propyl, t-butyl, cyclohexyl, adamantyl, octadecyl, and the like, but also alkyl substituents bearing further substituents known in the art, such as hydroxyl, alkoxy, vinyl, phenyl, halogen atoms (F, Cl, Br, and I), cyano, nitro, amino, carboxyl, ethers (e.g. $CH_3CH_2OCH_2$—), etc. On the other hand, the phrase "alkyl moiety" is limited to the inclusion of only pure open-chain and cyclic saturated hydrocarbon alkyl substituents, such as methyl, ethyl, propyl, t-butyl, cyclohexyl, adamantyl, octadecyl, and the like. Substituents which react with active ingredients, such as very strongly electrophilic or oxidizing substituents, would of course be excluded by the ordinary skilled artisan as not being inert or harmless.

When a general structure is referred to as "a compound having the nucleus of" a given formula, any substitution which does not alter the bond structure of the formula or the shown atoms within that structure, is included within that structure. For example, where there is a polymethine chain shown between two defined heterocyclic nuclei, substituent groups may be placed on the chain or on the heterocyclic nucleus, but the conjugation of the chain may not be altered and the atoms shown in the heterocyclic nuclei may not be replaced.

Other aspects, advantages, and benefits of the present invention are apparent from the detailed description, examples, and claims.

DETAILED DESCRIPTION OF THE INVENTION

Almost all infrared absorbing antihalation dyes have conjugated chains in them, usually between heterocyclic nuclei. These conjugated chains, polymethine chains, having at least pentamethine chains, usually at least heptamethine chains, and even up to nonamethine chains (with or without rigidizing groups within the chain) are often a point at which the basic antistatic agents can act to alter the structure and properties of the antihalation dyes and reduce their effectiveness. This is true with any class of infrared (or red) antihalation dye such as merocyanines, cyanines, (e.g., indolenines, benzotriazoles, benzoselenazoles, benzimidazoles, oxazoles, etc.) squaryliums, etc. and other known infrared (and red) absorbing dyes which could be used in photographic and photothermographic elements. The preferred dyes for use as an antihalation dye are the squarylium dyes disclosed in U.S. Pat. No. 5,380,635.

The Squarylium Dye

The photosensitive elements of this invention preferably include as acutance or antihalation dyes, dihydroperimidine squarylium dyes of the formulas set forth above.

According to one especially preferred embodiment $R^1$, $R^4$, $R^5$, and $R^8$ are hydrogen and $R^2$, $R^3$, $R^6$, and $R^7$ independently represent alkyl groups having from 1–20 carbon atoms, a cycloalkyl group having from 1–20 carbon atoms, an aralkyl group, an aryl group, or $R^2$ and $R^3$ taken together and $R^6$ and $R^7$ taken together form 5-, 6-, or 7-membered rings. Representative, nonlimiting dyes according to this preferred embodiment are:

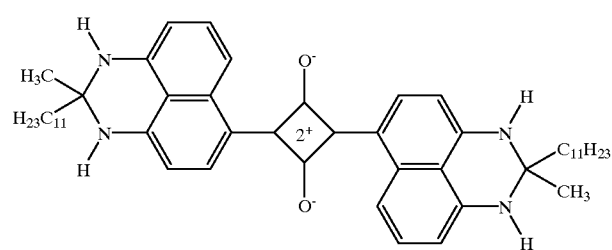

1a

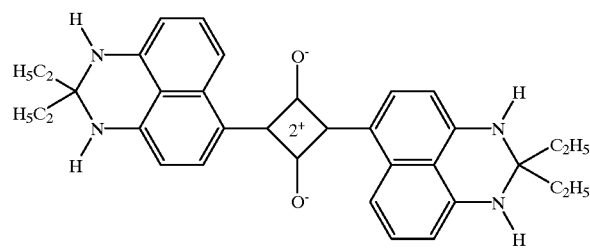

1b

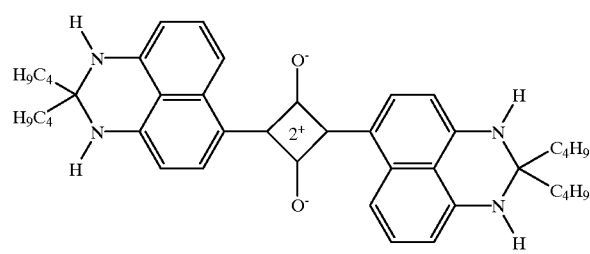

1c

-continued

1d
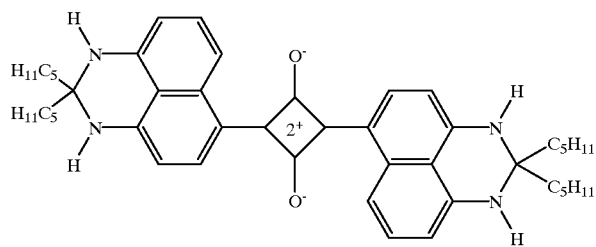

1e
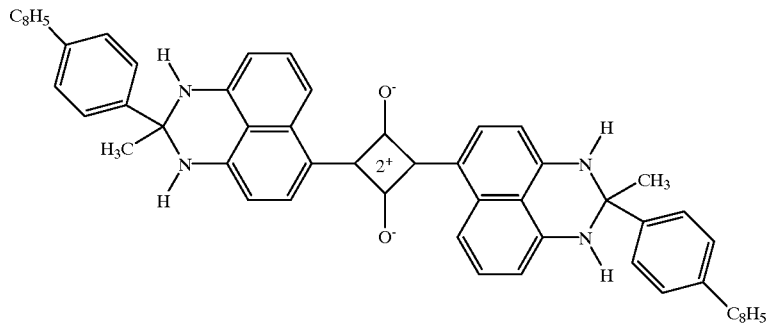

1f
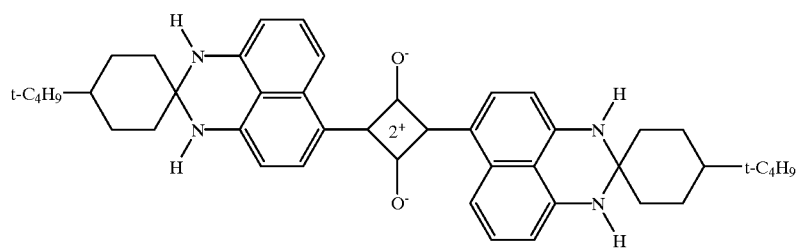

According to yet another preferred embodiment $R^3$ and $R^4$ are taken together and $R^7$ and $R^8$ are taken together to form cycloalkyl groups having 1–20 carbon atoms, $R^2$ and $R^6$ are aryl groups, and $R^1$ and $R^5$ are hydrogen. A preferred but non-limiting example includes:

2a
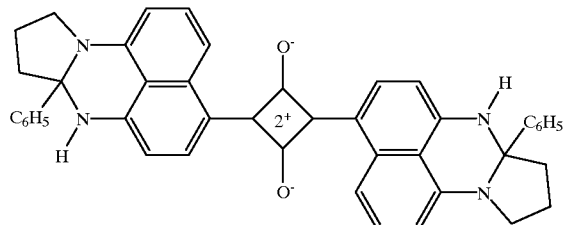

According to yet a third preferred embodiment, $R^3$ and $R^4$ are taken together and $R^7$ and $R^8$ are taken together to form lactam groups, $R^2$ and $R^6$ are alkyl or aryl groups and $R^1$ and $R^5$ are H. Representative dyes according to this embodiment are:

3a
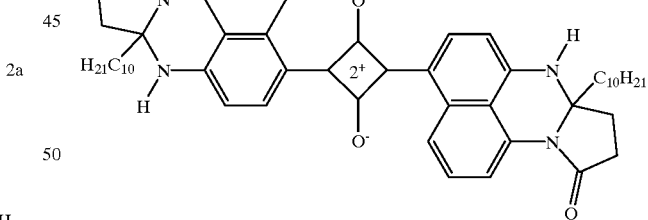

3b
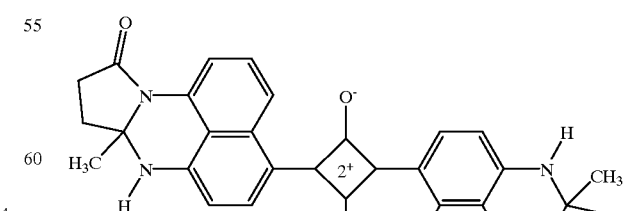

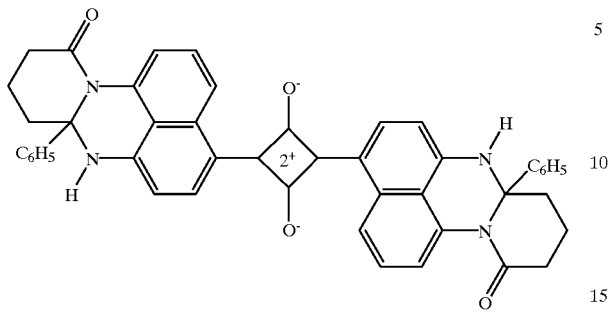

3c

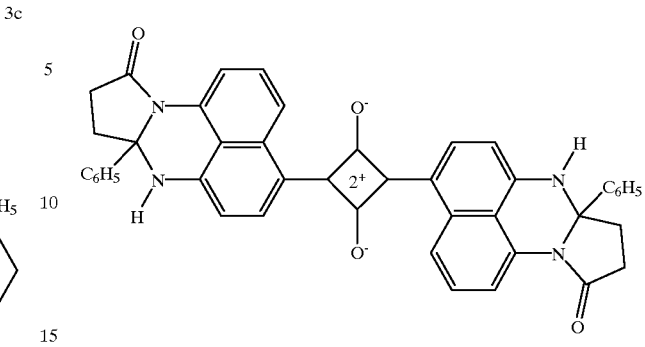

3d

According to yet another preferred embodiment the dihydroperimidine squarylium dye has the formula:

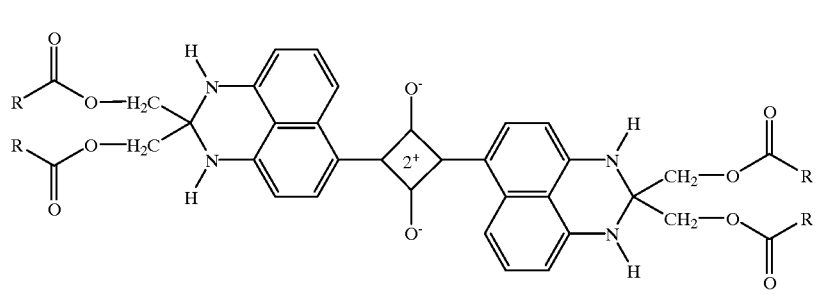

4 wherein R is an alkyl group of 1 to 20, preferably 4 to 20, carbon atoms. Exemplary R groups include but are not limited to propyl, butyl, pentyl, octyl, —CH$_3$—O—CH$_2$CH$_3$, —CH$_2$—O—CH$_2$CH$_2$—O—CH$_3$, etc.

A representative dye according to this embodiment is:

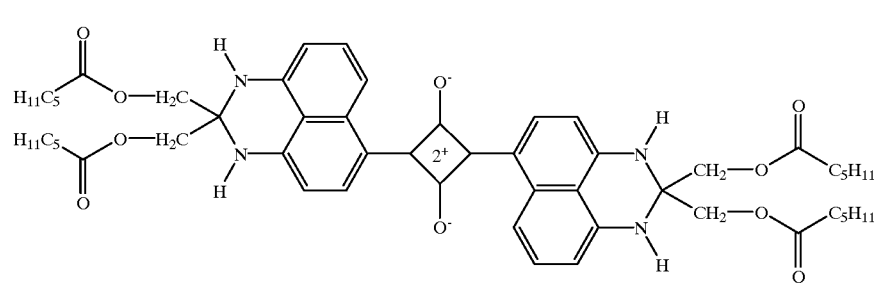

4a

Additional preferred embodiments have $R^1$, $R^4$, $R^5$, and $R^8$ as hydrogen and $R^2$, $R^3$, $R^6$, and $R^7$ as —CH$_2$OR$^9$ wherein $R^9$ is either —SiR'R''R''', where R', R'', and R''' independently represent an alkyl group of 1 to 20 carbon atoms, or —SO$_2$R$^{10}$ where $R^{10}$ is an alkyl group of 1 to 20, preferably 4 to 20 carbon atoms. Nonlimiting examples of such embodiments are:

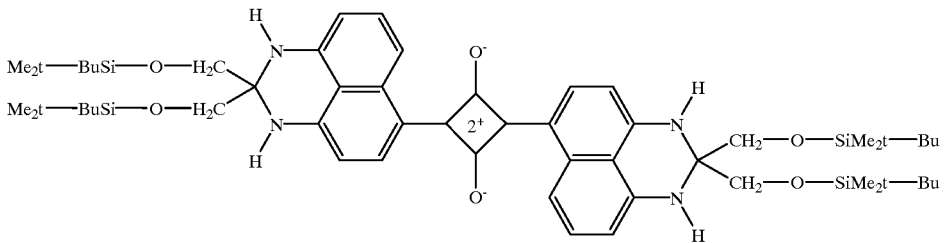

5

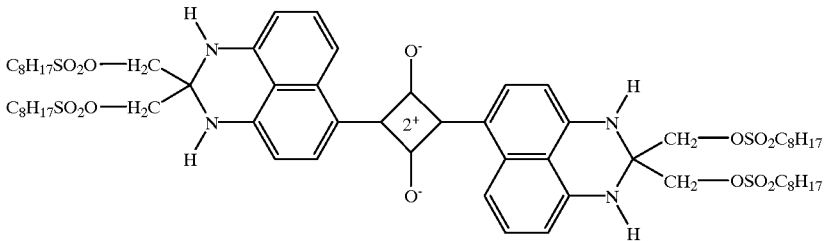

6

Other examples of embodiments of dyes suitable for use as near infrared antihalation or acutance dyes may include dyes wherein $R^1$ and $R^2$, $R^3$ and $R^4$, $R^5$ and $R^6$, and $R^7$ and $R^8$ are taken together to form cycloalkyl groups. Dyes of this type can be prepared by reaction of a ω,ω-dihaloketone with a 1,8-diaminonaphthalene, followed by condensation with squaric acid.

Still other examples of embodiments of dyes suitable for use as antihalation or acutance dyes may include, dyes wherein $R^1$ and $R^2$, and $R^5$ and $R^6$ are taken together to form lactam groups, while $R^3$ and $R^4$, and $R^7$ and $R^8$ are taken together to form cycloalkyl groups. Dyes of this type can be prepared by reaction of a ω-halo-keto-carboxylic ester with a 1,8-diaminonaphthalene, followed by condensation with squaric acid.

Selection of the appropriate substituent groups, $R^1$–$R^8$ may enable one to shift the peak absorption wavelength. For example, dyes of the type exemplified by structures 3a–3d have wavelength absorptions shifted 10–15 nm to shorter wavelengths from those exemplified by structures 1a–1f.

The squarylium dyes exemplified by structures 1a–1f may be prepared by condensing a ketone or an aldehyde with a 1,8-diaminonaphthalene in the presence of an acid catalyst, in a solvent such as toluene, under reflux conditions, with removal of the water from the reaction mixture as it is formed. The resultant dihydroperimidine product is typically isolated by distillation or crystallization. The dihydroperimidine, is then heated at reflux with squaric acid, [also known as 3,4-dihydroxy-3-cyclobutene-1,2-dione] in a mixture of toluene and n-butanol, again with removal of the liberated water as it is formed. The product, isolated by addition of petroleum ether and filtration, can be purified by chromatography and/or recrystallization. The preparation of dyes of this type is shown in Scheme 1.

Scheme 1

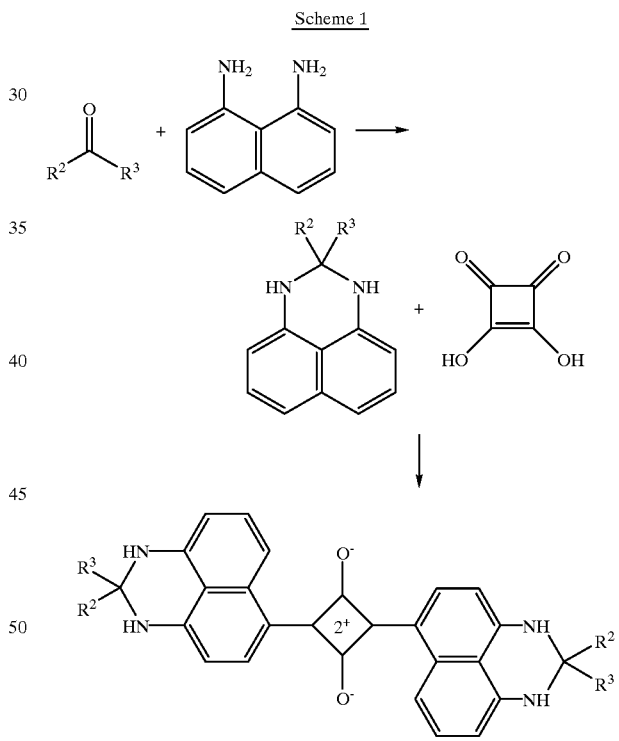

Dyes in which $R^3$ and $R^4$ and $R^7$ and $R^8$ form carbocyclic rings are similarly prepared. Thus, condensation of a ω-haloketone with a 1,8-diaminonaphthalene gives a ring fused dihydroperimidine. Reaction of this material with squaric acid gives dyes exemplified by structure 2a. The preparation of dyes of this type is shown in Scheme 2. In Scheme 2, n is an integer which represents the number of methine groups necessary to complete a 5-, 6-, or 7-membered ring.

Scheme 2

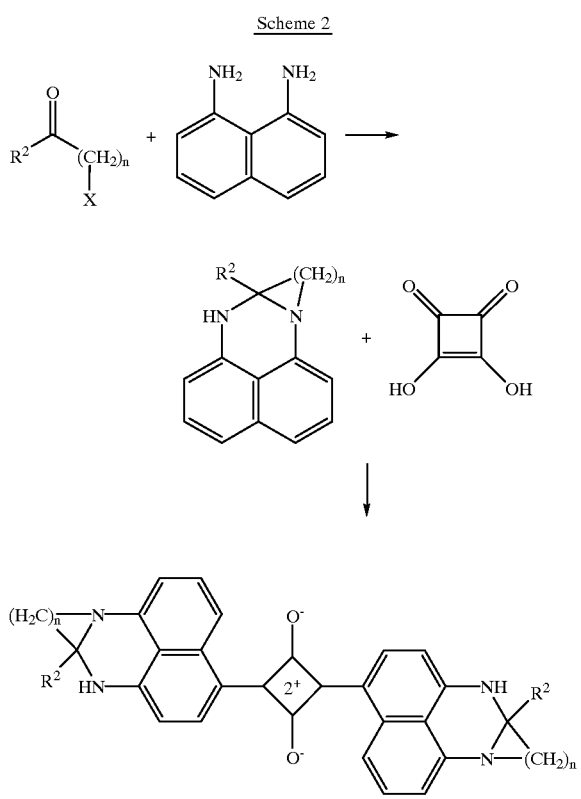

Dyes in which $R^3$ and $R^4$, and $R^7$ and $R^8$ form lactam are prepared by condensing a keto-carboxylic acid derivative (typically a keto-ester) with a 1,8-diaminonaphthalene to give a lactam fused dihydroperimidine. Reaction of this material with squaric acid gives dyes exemplified by structures 3a–3d. The preparation of dyes of this type is shown in Scheme 3. In Scheme 3, m is an integer which represents the number of methine groups necessary to complete the 5-, 6-, or 7-membered ring.

Scheme 3

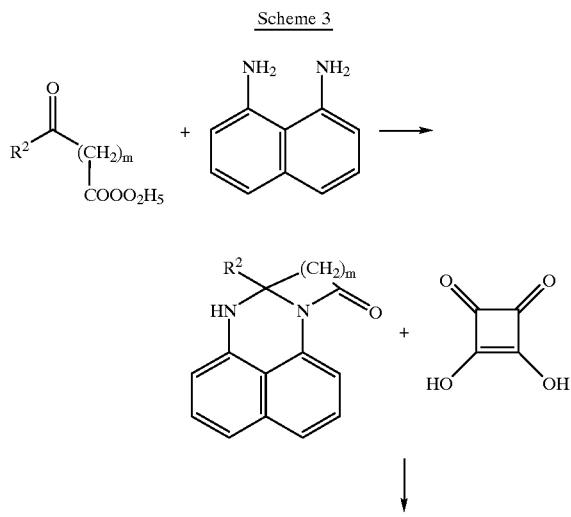

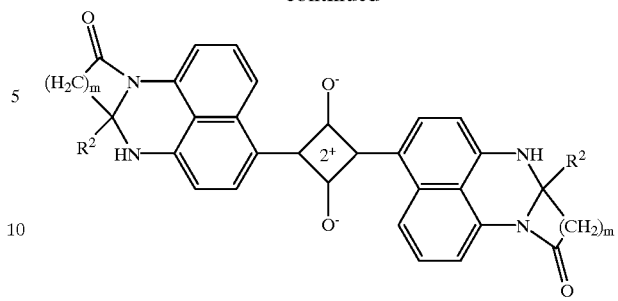

Antihalation and Acutance Constructions

The dihydroperimidine squarylium dye may be used in an antihalation coating for photothermography or photography or it may be used as an acutance or filter dye. The type of photothermographic element used in the invention is not critical. Examples of suitable photothermographic elements include dry silver systems (see, for example U.S. Pat. Nos. 3,457,075 and 5,258,274, both incorporated herein by reference) and diazo systems.

When used for antihalation purposes, the dihydroperimidine squarylium dye is usually coated together with an organic binder as a thin layer on a substrate and is present in a layer separate from the light-sensitive layer. The antihalation layer may be positioned above, below, or both above and below the light-sensitive layer, and if the support is transparent, an antihalation layer may be positioned on the surface of the support opposite the light-sensitive layer. When positioned above the light sensitive layer, the antihalation layer may alternatively be called a filter layer. When used for acutance purposes, the dihydroperimidine squarylium dyes are incorporated within the light-sensitive layer according to conventional techniques.

Whether used as an antihalation, acutance, or filter dye, in photographic or photothermographic elements, it is preferred to incorporate dyes in an amount sufficient to provide an optical density of from 0.05 to 3.0, more preferably from 0.1 to 2, absorbance units at $\lambda_{max}$ of the dye. The coating weight of the dye is generally from 0.001 to 1 g/m², preferably 0.001 to 0.05 g/m². When used in a separate layer, a wide variety of polymers are suitable for use as the binder. Non-limiting examples of these polymers include cellulose acetate butyrate, polyvinyl butyral, poly(vinylidene chloride), cellulose acetate, and various acrylic polymers.

In certain situations, absorption at a variety of wavelengths may be desirable. If so, more than one dye can be used. The dyes may be incorporated into the photosensitive element in any known configuration. For example, each dye may be in an independent antihalation layer, more than one dye may be contained in one antihalation layer, one dye may be an acutance dye while the other is used in an antihalation layer, etc.

EXAMPLES

All materials for which preparation procedures are not given were obtained commercially, many from Aldrich Chemical Co., Milwaukee, Wis. All percentages are by weight unless otherwise indicated. The following additional terms and materials were used.

Antistat-1 is $C_8F_{17}SO_3^- {}^+H_3N-(CH_2CH_2O)_{12}CH_2CH_2NH_3^{+-}O_3SC_8F_{17}$ BA is benzoic acid.

4-MPA is 4-methylphthalic acid.

TCPA is tetrachlorophthalic acid

CBBA is p-chlorobenzoylbenzoic acid.
AA is acetic acid
TCA is trichloroacetic acid
CAB 381-20 is a cellulose acetate butyrate resin available from Eastman Kodak Co.
MEK is methyl ethyl ketone (2-butanone).
PE-200 is a polyester resin available from Shell.
PET is poly(ethylene terephthalate).
PMMA-13 is Beads of 13 μm polymethylmethacrylate.
PSMA-8 Beads are 8 μm polystearylmethacrylate bead.
PSMA-13 Beads are 13 μm are polystearyl methacrylate beads.

Example 1

The deleterious nature of amines to the pot-life of bis (dihydroperimidine) squarylium dyes was demonstrated by preparing solutions of Dye 1a in 2-butanone, with and without added amine. Without added amine, 93% of the absorbance of the dye was retained after 22 hr. When 0.04% triethyl amine was added, only 42% of the absorbance of the dye was retained after 23 hr. When, 0.04% n-hexyl amine was added, essentially all of the absorbance of the dye had disappeared after 22.5 hr.

As will be shown below, addition of organic carboxylic acids having a pKa less than or equal to about 2.9 are very effective in reducing this effect.

Example 2

Samples 2-1 to 2-8 were prepared with a dihydroperimidine squarylium dye incorporated into an antihalation coating. Each solution contained the following materials.

| Material | Amount |
| --- | --- |
| CAB 381-20 | 2.257 g |
| PE-200 | 0.31 g |
| 2-butanone | 14.790 g |
| PSMA-8 | 0.029 g |
| PMMA-13 | 0.088 g |
| Antihalation Dye | 0.237 g dissolved in |
| 2-butanone | 2.240 g |
| Antistat-1 | 0.180 g dissolved in |
| 2-butanone | 0.359 g |

One half of each of the solutions made using the dyes and acid shown in the table were coated on a 7 mil clear poly(ethylene terephthalate) support at 3 mil wet thickness and dried for 3 minutes at 180° F. The other half of the solutions were stored for 24 hours at room temperature and coated as above.

| Sample | 2-1 | 2-2 | 2-3 | 2-4 |
| --- | --- | --- | --- | --- |
| Dye | Dye 1f | Dye 1f | Dye 4a | Dye 4a |
| Acid | 4-MPA | | 4-MPA | 4-MPA |
| Amount | 0.040 g | | 0.040 g | 0.05 g |

| Sample | 2-5 | 2-6 | 2-7 | 2-8 |
| --- | --- | --- | --- | --- |
| Dye | Dye 4a | Dye 4a | Dye 4a | Dye 4a |
| Acid | 4-MPA | 4-MPA | | BA |
| Amount | 0.060 g | 0.080 g | | 0.0272 g |

Absorbance was measured using a Hewlett Packard Diode array spectrophotometer.

The coatings were tested immediately after coating and drying for absorbance. The coatings were then stored for 24 hours at 70° F./20%RH and tested for conductivity properties.

The results, shown below, demonstrate that samples having no acid (i.e., Samples 2-2 and 2-7) lost more absorbance than corresponding samples containing acid in the antihalation solution.

Resistivity of each coating was measured on the Keithly 6105 surface resistivity meter. Incorporation of acid into the antihalation coatings appears to have little affect on the resistivity.

| Sample | Time | Peak Absorbance | Resistivity Ohms |
| --- | --- | --- | --- |
| 2-1a | Initial | 0.688 @ 816 | $3.1 \times 10^{13}$ |
| 2-1b | 24 Hours | 0.668 | $2.2 \times 10^{13}$ |
| 2-2a | Initial | 0.660 @ 816 | $3.2 \times 10^{13}$ |
| 2-2b | 24 Hours | 0.597 | $2.9 \times 10^{13}$ |
| 2-3a | Initial | 0.669 @ 798 | $5.4 \times 10^{13}$ |
| 2-3b | 24 Hours | 0.536 | $3.4 \times 10^{13}$ |
| 2-4a | Initial | 0.669 @ 800 | $4.2 \times 10^{13}$ |
| 2-4b | 24 Hours | 0.533 | $1.8 \times 10^{13}$ |
| 2-5a | Initial | 0.688 @ 800 | $3.9 \times 10^{13}$ |
| 2-5b | 24 Hours | 0.589 | $2.4 \times 10^{13}$ |
| 2-6a | Initial | 0.648 @ 800 | $4.1 \times 10^{13}$ |
| 2-6b | 24 Hours | 0.593 | $1.9 \times 10^{13}$ |
| 2-7a | Initial | 0.615 @ 798 | $4.1 \times 10^{13}$ |
| 2-7b | 24 Hours | 0.361 | $1.9 \times 10^{13}$ |
| 2-8a | Initial | 0.549 @ 798 | $8.4 \times 10^{12}$ |
| 2-8b | 24 Hours | 0.320 @ 798 | |

Charge Decay was measured on an ETS Static Decay Meter. This device applies a 5000 volt, maximum, electrical charge to the coated samples. If the coated sample does not accept the full 5000 volt charge, the data is not acceptable.

The 0% charge decay time indicates the time (in seconds) necessary to dissipate 100% of the charge (i.e., have 0% of the initial charge remaining). A short decay time is desired.

The 10% charge decay time indicates the time (in seconds) necessary to dissipate 90% of the electrical charge (i.e., have 10% of the initial charge remaining). A short decay time is desired.

The 50% charge decay time indicates the time (in seconds) necessary to dissipate 50% of the electrical charge. (i.e., have 50% of the initial charge remaining). A short decay time is desired.

Incorporation of acid into the antihalation coatings appears to have little affect on the charge decay time.

| | | Static Decay Time | | |
| --- | --- | --- | --- | --- |
| Sample | Time | 0% Charge Decay Time (sec) | 10% Charge Decay Time (sec) | 50% Charge Decay Time (sec) |
| 2-1a | Initial | >99 | 11.14 | 1.23 |
| 2-1b | 24 Hours | >99 | 12.79 | 1.00 |
| 2-2a | Initial | >99 | 12.99 | 1.13 |
| 2-2b | 24 Hours | >99 | 13.06 | 1.27 |
| 2-3a | Initial | >99 | 7.34 | 0.67 |
| 2-3b | 24 Hours | >99 | 9.27 | 0.82 |
| 2-4a | Initial | >99 | 7.80 | 0.83 |
| 2-4b | 24 Hours | 23.09 | 6.73 | 0.87 |
| 2-5a | Initial | >99 | 9.09 | 0.86 |
| 2-5b | 24 Hours | >99 | 8.30 | 0.87 |
| 2-6a | Initial | >99 | 10.49 | 0.96 |
| 2-6b | 24 Hours | >99 | 13.76 | 1.14 |
| 2-7a | 7 Initial | >99 | 11.20 | 1.00 |
| 2-7b | 24 Hours | >99 | 13.76 | 1.14 |
| 2-8a | Initial | 36.88 | 5.36 | 0.61 |
| 2-8b | 24 Hours | — | — | — |

Example 3

The following example, demonstrates that addition of acid retards bleaching of the antihatation dye and prolongs pot-life of the antihalation coating solution.

Dye 4a (12 mg) and the acid given below were dissolved in 9.00 g of a 1.0% solution of Antistat-1 in 2-butanone. 1 mL of this solution was diluted to 250 mL with 2-butanone and the absorbance at 806 nm ($\lambda$max) measured. The remainder of the undiluted solution was kept at room temperature. After 24 hr, 1 mL of this solution was again diluted to 250 mL with 2-butanone and the absorbance again measured.

As shown below, all three acid containing solutions retained their absorbance better than corresponding control solutions containing no acid. The strongest of these acids (TCA) performed best, losing only 2% of its absorbance after 24 hr. The data below also demonstrates that while benzoic acid (BA) and acetic acid (AA) provide some protection against antihalation layer bleaching, acids with $pKa \leq 2.9$ have the best effect.

The data below demonstrates that while BA and AA have some positive effect, acids with $pKa \leq 2.9$ have the best effect. The precise threshold is not known.

Solution Pot Life

| Sample | Acid | Solution Age (hr) | Absorbance (OD) | Absorbance Loss (%) |
|---|---|---|---|---|
| 3-1a | None | 0 | 0.865 | — |
| 3-1b | None | 24 | 0.495 | 43% |
| 3-2a | 14 mg BA | 0 | 0.781 | — |
| 3-2b | 14 mg BA | 24 | 0.571 | 27% |
| 3-3a | 11 mg AA | 0 | 0.762 | — |
| 3-3b | 11 mg AA | 24 | 0.555 | 27% |
| 3-4a | 19 mg TCA | 0 | 0.672 | — |
| 3-4b | 19 mg TCA | 24 | 0.658 | 2% |

Example 4

An antihalation binder solution premix was prepared as follows:

Binder Solution Formulation

| Material | Amount % |
|---|---|
| 2-Butanone | 85.1032% |
| PE-200 | 0.5440% |
| CAB 381-20 | 11.5248% |
| 2-butanone | 2.0321% |
| CAB 381-20 | 0.1858% |
| PSMA-8 Beads | 0.1526% |
| PMMA-13 Beads | 0.4576% |
| Total | 100.00% |

An antihalation coating solution was prepared as follows:

| Control | | Experimental Coating | |
|---|---|---|---|
| 43.0 g | Binder Solution | 43.0 g | Binder Solution |
| 5.6 g | Methanol | 5.6 g | 2-butanone |
| 0.059 g | Dye 1f or Dye 4a | 0.059 g | Dye 4a dye |
|  |  | 0.1 g | Acid |
| 0.9 g | 2-butanone | 0.9 g | 2-butanone |
| 0.45 g | Antistat-1 | 0.45 g | Antistat-1 |

One half of each of the solutions made using the dyes and acid found in the table were coated on a 7 mil clear poly(ethylene terephthalate) support at 2.3 mil wet thickness and dried for 4 minutes at 190° F. The other half of the solutions were held for 24 hours in the dark, at room temperature and coated as above, unless otherwise noted.

Absorbance were measured using a Hitachi U-3110 spectrophotometer.

The coated materials were tested in the 70° F./20% RH chamber after 24 hours of sample acclimation to chamber conditions.

| Sample | 4-1 | 4-2 | 4-3 | 4-4 |
|---|---|---|---|---|
| Dye | Dye 1f | Dye 1f | Dye 4a | Dye 4a |
| Acid | No Acid | 4-MPA | TCPA | CBBA |
| Amount |  | 0.1 g | 0.1 g | 0.1 g |

| Sample | 4-5 | 4-6 | 4-7 | 4-8 | 4-9 |
|---|---|---|---|---|---|
| Dye | Dye 1f | Dye 4a | Dye 4a | Dye 4a | Dye 4a |
| Acid | No acid | No acid | 4-MPA | TCPA | CBBA |
| Amount |  |  | 0.1 g | 0.1 g | 0.1 g |

Solution pot-life studies were carried out as described above in Example 3. In this example, a solutions were for 4 days. The results, shown below, demonstrate that

Solution Pot Life

| | Sample | | | | | |
|---|---|---|---|---|---|---|
| $\lambda$ max nm | 4-1a Initial | 4-1b 4 Days | 4-2a Initial | 4-2b 4 Days | 4-3a Initial | 4-3b 4 Days |
| 795 | 0.3843 | 0.3525 | 0.3829 | 0.2802 | 0.6053 | 0.5009 |
| 800 | 0.4358 | 0.4012 | 0.4350 | 0.3178 | 0.6140 | 0.5109 |
| 805 | 0.4817 | 0.4436 | 0.4820 | 0.3524 | 0.5840 | 0.4927 |
| 810 | 0.5143 | 0.4735 | 0.5159 | 0.3782 | 0.5216 | 0.4456 |
| 815 | 0.5357 | 0.4839 | 0.5296 | 0.3907 | 0.4354 | 0.3815 |

| $\lambda$ max nm | 4-4a Initial | 4-4b 4 Days | 4-5a Initial | 4-5b 24 hr | 4-6a Initial | 4-6b 24 hr |
|---|---|---|---|---|---|---|
| 795 | 0.5904 | 0.1308 | 0.4247 | 0.3990 | 0.6271 | 0.4279 |
| 800 | 0.5980 | 0.1323 | 0.4800 | 0.4445 | 0.6287 | 0.4324 |
| 805 | 0.5699 | 0.1260 | 0.5279 | 0.4919 | 0.5938 | 0.4087 |
| 810 | 0.5070 | 0.1124 | 0.5616 | 0.5252 | 0.5231 | 0.3614 |
| 815 | 0.4232 | 0.0949 | 0.5725 | 0.5387 | 0.4347 | 0.2988 |

| $\lambda$ max nm | 4-7a Initial | 7b 24 hr | 4-8a Initial | 4-8b 24 hr | 4-9a Initial | 4-9b 24 hr |
|---|---|---|---|---|---|---|
| 795 | 0.6836 | 0.6100 | 0.5961 | 0.6021 | 0.5345 | 0.3454 |
| 800 | 0.6892 | 0.6200 | 0.5998 | 0.6108 | 0.5385 | 0.3503 |
| 805 | 0.6555 | 0.5919 | 0.5701 | 0.5824 | 0.5111 | 0.3328 |
| 810 | 0.5829 | 0.5285 | 0.5057 | 0.5196 | 0.4553 | 0.2955 |
| 815 | 0.4878 | 0.4431 | 0.4219 | 0.4349 | 0.3783 | 0.2463 |

The 0%, 10%, and 50% static decay times were determined as described above. The results, shown below, indicate incorporation of acid into the antihalation coatings appears to have little affect on the resistivity.

| Sample | Static Decay Time (Seconds) | | | |
|---|---|---|---|---|
| | 4-1 | 4-2 | 4-3 | 4-4 |
| 0% | 23.49 sec | 37.05 | 18.17 | 6.54 |
| 10% | 5.25 sec | 3.6 | 5.63 | 3.55 |
| 50% | 0.23 sec | 0.23 | 0.35 | 0.43 |
| Sample | 4-5 | 4-6 | 4-7 | 4-8 | 4-9 |
| 0% | 14.37 | 20.00 | 18.40 | 21.90 | 11.37 |
| 10% | 4.30 | 3.98 | 7.27 | 3.49 | 3.08 |
| 50% | 0.40 | 0.55 | 0.48 | 0.73 | 0.34 |

Example 5

The following example demonstrates that incorporation of acids in combination with basic antistatic compounds provides antihalation coatings provides improved Dye Efficiency Dye Efficiency=Peak Absorbance (Optical Density)/Visula Dmin $$\text{Dye Efficiency} = \frac{\text{Peak Absorbance (Optical Density)}}{\text{Visual Dmin}}$$

Dye Efficiency

| Sample | 4–5a | 4–5b | 4–6a | 4–6b | 4–7a | 7b |
|---|---|---|---|---|---|---|
| | Initial | 24 hr | Initial | 24 hr | Initial | 24 hr |
| Efficiency | 47.76 | 38.56 | 105.57 | 72.92 | 115.45 | 103.13 |
| Sample | 4–8a | 4–8b | 4–9a | 4–9b | | |
| λmax nm | Initial | 24 hr | Initial | 24 hr | | |
| Efficiency | 100.50 | 102.75 | 90.18 | 87.89 | | |

Reasonable modifications and variations are possible from the foregoing disclosure without departing from either the spirit or scope of the present invention as defined by the claims.

What is claimed is:

1. An infrared photosensitive element comprising:
   a support bearing an infrared radiation-sensitive silver halide material;
   and an antihalation layer comprising a basic antistatic agent, an acid having a pKa less than 4.2 in an amount equal to at least 0.50 mole equivalent of acid to 1 mole equivalent of base in said basic antistatic agent and sufficient antihalation dye to provide a transmission optical density at the wavelength of maximum absorbance of said dye of at least 0.05 to 3.0 after coating.

2. An infrared photosensitive element comprising:
   a support bearing an infrared radiation-sensitive silver halide material;
   and an antihalation layer comprising a basic amine antistatic agent, an acid having a pKa less than 4.2 in an amount equal to at least 0.50 mole equivalent of acid to 1 mole equivalent of amine in said antistatic agent, and sufficient antihalation dye to provide a transmission optical density at the wavelength of maximum absorbance of said dye of at least 0.2, wherein said antihalation dye comprises a dihydroperimidine squarylium dye having the nucleus:

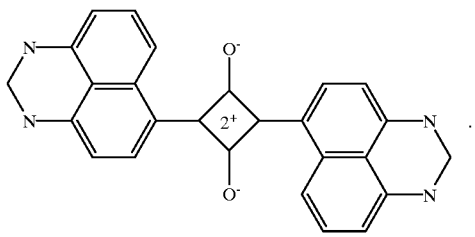

3. The photosentive element of claim 2 wherein said antihalation dye comprises a bis(dihydroperimidine) squarylium dye.

4. The photosensitive element of claim 1 wherein said basic antistatic agent is an amine antistatic agent.

5. The photosensitive element of claim 4 wherein said acid is an organic acid having a pKa of less than 4.2.

6. The photosensitive element of claim 1 wherein said amine antistatic agent has the formula:

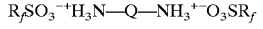

wherein Rf is a highly fluorinated group, and Q is a divalent polyoxyalkylene group.

7. The photosensitive element of claim 6 wherein $R_f$ is a perfluoroalkyl group and Q has from 2 to 90 carbon atoms therein.

8. The photosensitive element of claim 7 wherein said acid is an organic acid having a pKa of less than 3.5.

9. The photosensitive element of claim 1 in which said dye is present in an amount sufficient to provide a transmission optical density of at least 0.2 at λmax of the dye after coating.

10. The photosensitive element of claim 9 in which the dihydroperimidine squarylium dye has the formula:

4a

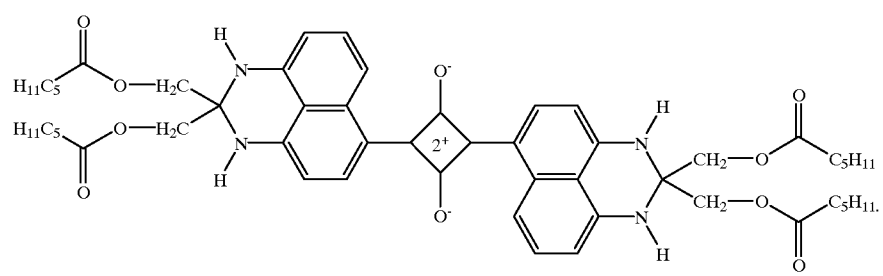

11. The infrared photosensitive element of claim 1 wherein said antihalation dye comprises a bis (dihydroperimidine)squarylium dye.

12. The photosensitive element of claim 1 wherein said element is photothermographic.

13. The photosensitive element of claim 12 wherein the dihydroperimidine squarylium dye has the general formula:

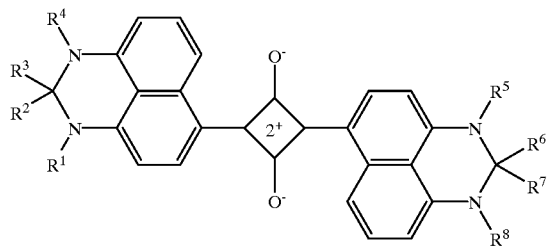

wherein $R^1$, $R^4$, $R^5$, and $R^8$ each independently represent hydrogen, an alkyl group having from 1–20 carbon atoms, a cycloalkyl group having from 1–20 carbon atoms, an aryl group having up to 14 carbon atoms, an aralkyl group, and $R^2$, $R^3$, $R^6$, and $R^7$, each independently represent hydrogen, an alkyl group having from 1–20 carbon atoms, a cycloalkyl group having from 1–20 carbon atoms, an aryl group having up to 14 carbon atoms an aralkyl group, or —$CH_2OR^9$ wherein $R^9$ is selected from the group consisting of: an alkyl acyl group; —C(=O)R where R is an alkyl group of 1 to 20 carbon atoms; —SiR'R''R''' where R', R'', and R''' independently represent an alkyl group of 1 to 20 carbon atoms; and —$SO_2R^{10}$ where $R^{10}$ is an alkyl group of 1 to 20 carbon atoms; or $R^1$ and $R^2$, and/or $R^3$ and $R^4$, and/or $R^5$ and $R^6$ and/or $R^7$ and $R^8$; or $R^2$ and $R^3$ and/or $R^6$ and $R^7$ are bonded together to form a 5-, 6-, or 7-membered ring.

14. The photosensitive element of claim 12 wherein said element is photothermographic.

15. The photosensitive element of claim 12 in which the dihydroperimidine squarylium dye has the formula:

17. The photosensitive element of claim 16 wherein $R_f$ is a perfluoroalkyl group and Q has from 2 to 90 carbon atoms therein.

18. The photosensitive element of claim 17 wherein said acid is an organic acid having a pKa of less than 4.2.

19. An infrared photosensitive element comprising:
a support bearing an infrared radiation-sensitive silver halide material;
and an antihalation layer comprising a basic antistatic agent, an acid having a pKa less than 4.2 in an amount equal to at least 0.50 moles of acid per mole of said antistatic agent, and sufficient antihalation dye to provide a transmission optical density at the wavelength of maximum absorbance of said dye of at least 0.2 after coating.

20. An infrared photosensitive element comprising:
1) a support having two sides,
2) one side of said support having an infrared-sensitive silver halide imaging layer coated thereon, and
3) the other side of said support having an antihalation layer coated thereon, said antihalation layer comprising an amine antistatic agent, an acid having a pKa of less than 4.2 in an amount equal to at least 0.50 mole equivalent of acid to one mole equivalent of amine in said antistatic agent, and sufficient antihalation dye to provide a transmission optical density at the wavelength of maximum absorbance of said dye of at least 0.2 after coating.

21. The element of claim 20 wherein said silver halide imaging layer comprises a photothermographic layer.

22. The element of claim 21 wherein said antihalation dye comprises a dihydropyrimidine squarylium dye.

23. An infrared photosensitive element comprising:
a support bearing an infrared radiation-sensitive silver halide material;
and an antihalation layer consisting essentially of a polymeric binder, a basic antistatic agent, an acid having a pKa less than 4.2 in an amount equal to at least 0.50 mole equivalent of acid to 1 mole equivalent of base in said basic antistatic agent, and sufficient infrared radiation absorbing antihalation dye to provide a transmission optical density at the wavelength of maximum absorbance of said dye of at least 0.05 to 3.0 after coating.

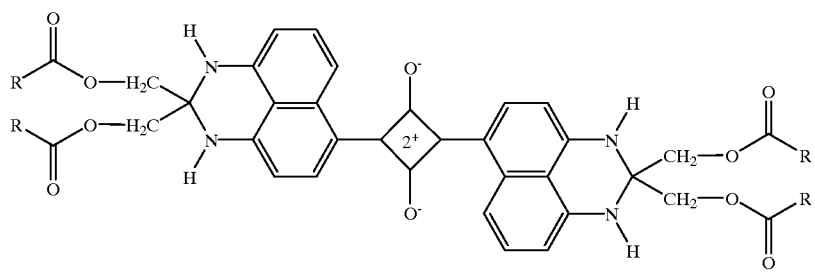

wherein R is an alkyl group of 4 to 20 carbon atoms.

16. The photosensitive element of claim 12 wherein said amine antistatic agent has the formula:

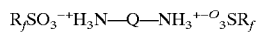

wherein $R_f$ is a highly fluorinated alkyl or aryl group;
Q is a divalent polyoxyalkylene group.

24. An infrared photosensitive element comprising:
a support bearing an infrared radiation-sensitive silver halide material;
and an antihalation layer consisting essentially of polymeric binder, a basic amine antistatic agent, an acid having a pKa less than 4.2 in an amount equal to at least 0.50 mole equivalent of acid to 1 mole equivalent of amine in said antistatic agent, and sufficient antihalation dye to provide a transmission optical density at the wavelength of maximum absorbance of said dye of at least 0.2, wherein said antihalation dye comprises a dihydroperimidine squarylium dye having the nucleus:

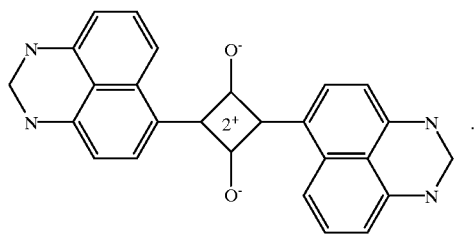

25. The photosensitive element of claim 24 wherein the dihydroperimidine squarylium dye has the general formula:

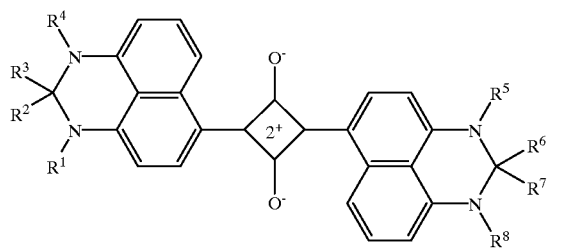

wherein
- $R^1$, $R^4$, $R^5$, and $R^8$ each independently represent hydrogen, an alkyl group having from 1–20 carbon atoms, a cycloalkyl group having from 1–20 carbon atoms, an aryl group having up to 14 carbon atoms, an aralkyl group, and
- $R^2$, $R^3$, $R^6$, and $R^7$, each independently represent hydrogen, an alkyl group having from 1–20 carbon atoms, a cycloalkyl group having from 1–20 carbon atoms, an aryl group having up to 14 carbon atoms, an aralkyl group, or —$CH_2OR^9$ wherein $R^9$ is selected from the group consisting of: an alkyl acyl group; —C(=O)R where R is an alkyl group of 1 to 20 carbon atoms; —SiR'R''R''' where R', R'', and R''' independently represent an alkyl group of 1 to 20 carbon atoms; and —$SO_2R^{10}$ where $R^{10}$ is an alkyl group of 1 to 20 carbon atoms; or
- $R^1$ and $R^2$, and/or $R^3$ and $R^4$, and/or $R^5$ and $R^6$ and/or $R^7$ and $R^8$; or $R^2$ and $R^3$ and/or $R^6$ and $R^7$ are bonded together to form a 5-, 6-, or 7-membered ring.

26. The photosensitive element of claim 24 wherein said element is photothermographic.

27. The photosensitive element of claim 25 wherein said element is photothermographic.

28. An infrared photosensitive element comprising:
a support bearing an infrared radiation-sensitive silver halide material;
and an antihalation layer consisting of a polymeric binder, a basic antistatic agent, an acid having a pKa less than 4.2 in an amount equal to at least 0.50 mole equivalent of acid to 1 mole equivalent of base in said basic antistatic agent, and sufficient infrared radiation absorbing antihalation dye to provide a transmission optical density at the wavelength of maximum absorbance of said dye of at least 0.05 to 3.0 after coating.

29. The photosensitive element of claim 26 wherein said element is photothermographic.

30. An infrared photosensitive element comprising:
a support bearing an infrared radiation-sensitive silver halide material;
and an antihalation layer consisting of polymeric binder, a basic amine antistatic agent, an acid having a pKa less than 4.2 in an amount equal to at least 0.50 mole equivalent of acid to 1 mole equivalent of amine in said antistatic agent, and sufficient antihalation dye to provide a transmission optical density at the wavelength of maximum absorbence of said dye of at least 0.2, wherein said antihalation dye comprises a dihydroperimidine squarylium dye having the nucleus:

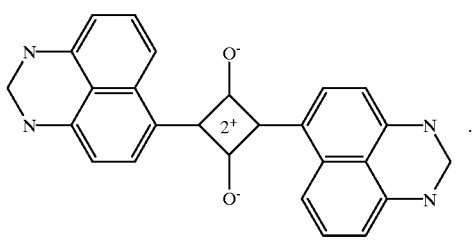

31. The photosensitive element of claim 30 wherein the dihydroperimidine squarylium dye has the general formula:

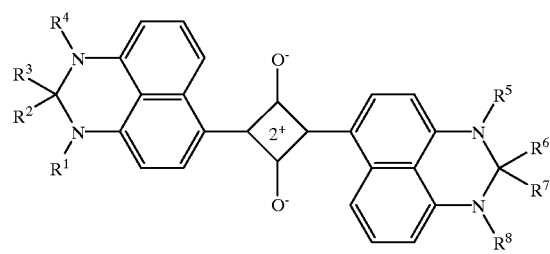

wherein
- $R^1$, $R^4$, $R^5$, and $R^8$ each independently represent hydrogen, an alkyl group having from 1–20 carbon atoms, a cycloalkyl group having from 1–20 carbon atoms, an aryl group having up to 14 carbon atoms, an aralkyl group, and
- $R^2$, $R^3$, $R^6$, and $R^7$, each independently represent hydrogen, an alkyl group having from 1–20 carbon atoms, a cycloalkyl group having from 1–20 carbon atoms, an aryl group having up to 14 carbon atoms, an aralkyl group, or —$CH_2OR^9$ wherein $R^9$ is selected from the group consisting of: an alkyl acyl group; —C(=O)R where R is an alkyl group of 1 to 20 carbon atoms; —SiR'R''R''' where R', R'', and R''' independently represent an alkyl group of 1 to 20 carbon atoms; and —$SO_2R^{10}$ where $R^{10}$ is an alkyl group of 1 to 20 carbon atoms; or
- $R^1$ and $R^2$, and/or $R^3$ and $R^4$, and/or $R^5$ and $R^6$ and/or $R^7$ and $R^8$; or $R^2$ and $R^3$ and/or $R^6$ and $R^7$ are bonded together to form a 5-, 6-, or 7-membered ring.

32. The photosensitive element of claim 30 wherein said element is photothermographic.

* * * * *